UNITED STATES PATENT OFFICE.

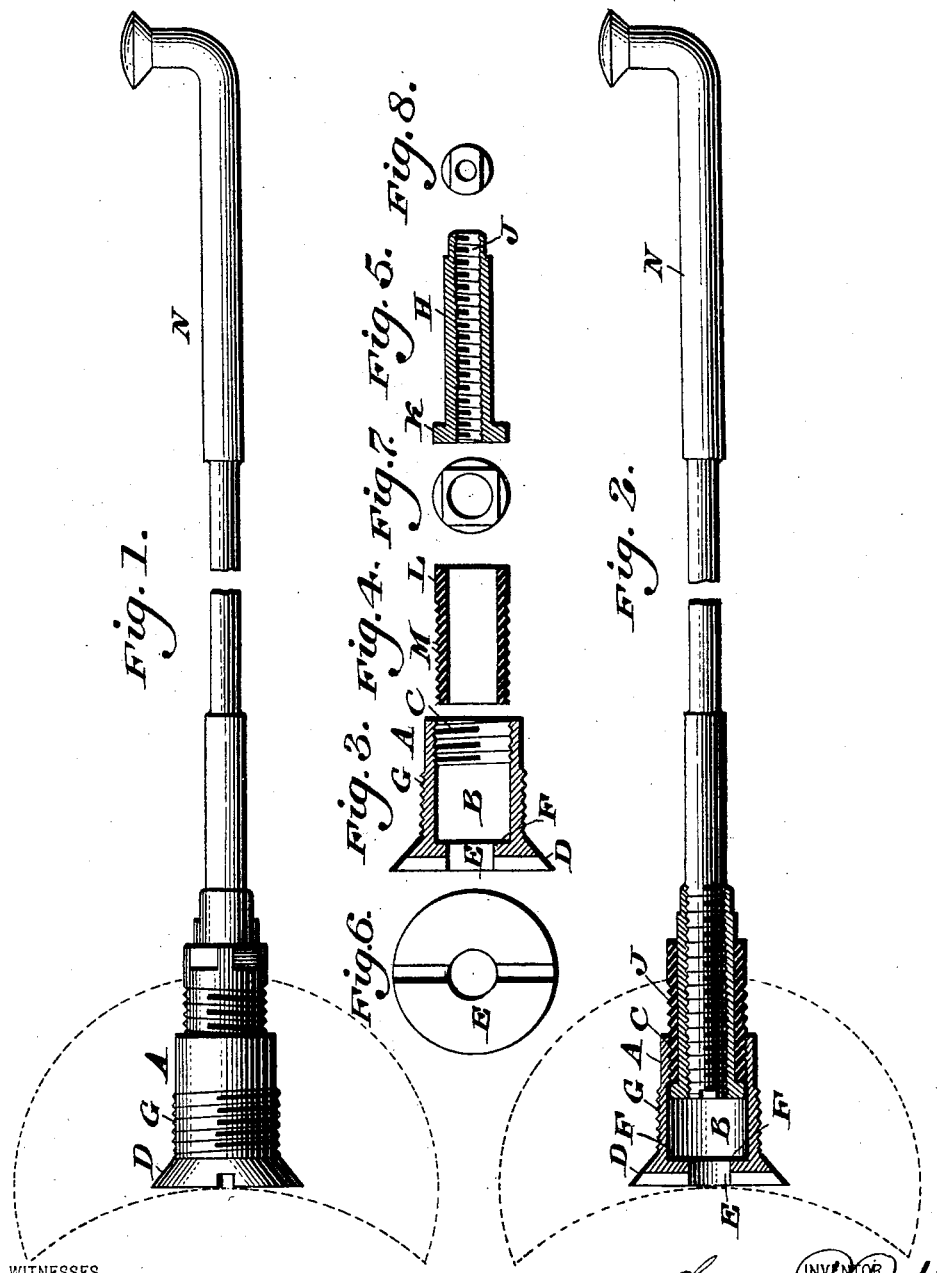

HARRY PHILIP ROTH, OF PHILADELPHIA, PENNSYLVANIA.

DEVICE FOR ADJUSTING BICYCLE-SPOKES.

SPECIFICATION forming part of Letters Patent No. 600,176, dated March 8, 1898.

Application filed May 15, 1897. Serial No. 637,020. (No model.)

*To all whom it may concern:*

Be it known that I, HARRY PHILIP ROTH, a citizen of the United States, residing in the city and county of Philadelphia, State of Pennsylvania, have invented a new and useful Device for Adjustment of Bicycle and other Spokes, of which the following is a specification.

My invention relates to devices for attaching the spokes to wheels of vehicles, particularly those using wire spokes, and has for its object to allow the easy and expeditious detachment or removal of broken or otherwise useless spokes and their replacement by new ones.

It also consists of novel details of construction, all as will be hereinafter fully set forth, and particularly pointed out in the claim.

I attain these objects by the mechanism illustrated in the accompanying drawings, in which—

Figure 1 represents a side elevation of a spoke-attaching device embodying my invention, showing a spoke in position. Fig. 2 represents a vertical sectional view of the device with a spoke in elevation. Figs. 3, 4, and 5 represent vertical sectional views of my device in detached position. Figs. 6, 7, and 8 represent plan views thereof, respectively.

Similar letters refer to similar parts throughout the several views.

Referring to the drawings, A designates a socket provided with a bore B, partly screw-threaded, as at C, and has a head D, with a bore E of reduced diameter, forming shoulders F; but the said bore E may be dispensed with, if desired. The socket is also provided with peripheral screw-threads G or other suitable means for securing the same in the felly of the wheel.

H designates a sleeve adapted to enter the socket A, its bore being provided with screw-threads J, and having upon one of its ends the head K, said sleeve being adapted to receive the threaded end of a spoke.

L designates a collar adapted to fit over and surround the sleeve H, and has peripheral screw-threads M, adapted to engage the screw-threads C on the bore of the socket A.

The operation is as follows: The socket A is screwed into a cavity in the felly before the tire is secured thereon, the peripheral screw-threads G engaging the walls of said cavity. Said socket is inserted from the outer face of the felly, its head sunk into the same and remains permanent therein. The collar L is slipped on the spoke which has been secured in place in the hub, and, its other end being now secured to the sleeve H, the latter is inserted in the socket, its head K resting upon shoulders F, if desired, and the collar is lowered and screwed to said socket, thereby holding the spoke firmly in position. The collar is removed from the socket to remove the spoke, so that the sleeve can be unscrewed from the spoke, and the same can be easily taken from the hub and a new one inserted, and the latter becomes free.

It will be noticed that all screw-threads are right and left. Hence in unscrewing one portion the other remains intact.

Having thus described my invention, what I claim as new, and desire to secure by Letters Patent, is—

A spoke-attaching device consisting of a socket having shoulders and an exteriorly-threaded portion, an interiorly-threaded sleeve adapted to engage a threaded portion of a spoke and provided at one end, with a flange forming the head, and a rotatable collar embracing said sleeve and having exterior threads engaging threads on the interior of said socket, said collar bearing against said heads on said sleeve.

HARRY PHILIP ROTH.

Witnesses:
C. DUNCAN WIMMER,
PETER W. SEITZ.